(12) United States Patent
Senatori

(10) Patent No.: US 8,189,331 B2
(45) Date of Patent: May 29, 2012

(54) THERMAL MANAGEMENT SYSTEMS AND METHODS

(75) Inventor: Mark David Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 12/787,245

(22) Filed: May 25, 2010

(65) Prior Publication Data

US 2011/0292592 A1    Dec. 1, 2011

(51) Int. Cl.
    *H05K 7/20*    (2006.01)
(52) U.S. Cl. ........... 361/679.48; 361/679.49; 361/679.5; 361/695; 165/104.34
(58) Field of Classification Search .................. None
    See application file for complete search history.

(56) References Cited

U.S. PATENT DOCUMENTS

| | | | | |
|---|---|---|---|---|
| 5,424,915 | A | * | 6/1995 | Katooka et al. ............... 361/695 |
| 5,991,153 | A | * | 11/1999 | Heady et al. .................. 361/704 |
| 6,094,347 | A | * | 7/2000 | Bhatia .......................... 361/695 |
| 6,529,375 | B2 | * | 3/2003 | Miyahara et al. ............. 361/697 |
| 6,545,866 | B2 | | 4/2003 | Katsui et al. |
| 6,775,135 | B2 | | 8/2004 | Lo |
| 6,859,364 | B2 | | 2/2005 | Yuasa et al. |
| 6,940,718 | B2 | * | 9/2005 | Gedamu et al. ............... 361/695 |
| 6,980,418 | B1 | | 12/2005 | Seeger et al. |
| 7,054,157 | B2 | * | 5/2006 | Hirota et al. .................. 361/695 |
| 7,218,517 | B2 | * | 5/2007 | Wolford et al. ............... 361/695 |
| 7,480,140 | B2 | * | 1/2009 | Hara et al. ..................... 361/692 |
| 7,554,805 | B2 | * | 6/2009 | Liu et al. ....................... 361/695 |
| 7,606,027 | B2 | * | 10/2009 | Takasou ........................ 361/695 |
| 7,643,284 | B2 | * | 1/2010 | Nakamura ............... 361/679.47 |
| 7,724,521 | B2 | * | 5/2010 | Nelson et al. ................. 361/695 |
| 2009/0002945 | A1 | * | 1/2009 | Kenny .......................... 361/695 |

FOREIGN PATENT DOCUMENTS

JP    11202978 A    7/1999

* cited by examiner

*Primary Examiner* — Boris Chervinsky

(57) ABSTRACT

A thermal management system is provided. The system can include an electronic device enclosure having a first surface and a second surface. At least a portion of the perimeter of the first surface can be disposed proximate the second surface to provide a chamber between the first and second surfaces. At least one first aperture in fluid communication with the chamber can be disposed on the second surface, while at least one second aperture in fluid communication with the chamber can be disposed on the first surface. A fluid mover, having a fluid inlet and a fluid discharge, can be disposed proximate the second aperture. Fluid from the chamber can provide an inflow to the fluid inlet and an outflow from the fluid discharge can be directed to the exterior of the electronic enclosure.

16 Claims, 5 Drawing Sheets

THERMAL MANAGEMENT SYSTEMS AND METHODS

BACKGROUND OF THE INVENTION

Description of the Related Art

Portable electronic devices continue to grow in popularity to the point of ubiquitousness. Along with the growing popularity of tablet computers, portable computers, cellular devices, and handheld gaming systems, comes an increasing popular demand to shrink the size of the device while improving the performance and responsiveness of the device. In response, designers have wrapped higher and higher performing electronic products in smaller and smaller packages. Such designs however suffer from the tendency for high performance devices to generate considerable quantities of heat, which in a smaller device, raises the external temperature of the device to unacceptable levels.

BRIEF DESCRIPTION OF THE DRAWINGS

Advantages of one or more disclosed embodiments may become apparent upon reading the following detailed description and upon reference to the drawings in which.

DETAILED DESCRIPTION

The ongoing demand to house higher performance electronic devices within ever decreasing enclosures exposes a fundamental limitation of the electronic device-heat generation. What was manageable in a larger enclosure becomes vastly more complex within the tight confines of modern electronic devices. This issue becomes particularly acute when the heat generated by the electronic device raises the surface temperature of the device to a level perceptible by the device user. The surface temperature of an electronic device can be thermally managed to maintain user comfort across a wide range of operating conditions.

A thermal management system is provided. The system can include an electronic device enclosure having a first surface and a second surface. At least a portion of the perimeter of the first surface can be disposed proximate the second surface to provide a chamber between the first and second surfaces. The second surface can include at least one first aperture in fluid communication with the chamber. The first surface can include at least one second aperture in fluid communication with the chamber. The system can further include at least one fluid mover, having a fluid inlet and a fluid discharge, disposed proximate the second aperture. The chamber can provide an inflow to the fluid inlet and the outflow from the fluid discharge is directed to the exterior of the electronic enclosure.

A thermal management method is also provided. The method can include flowing a fluid into a chamber via a first aperture. The chamber can be formed using a first surface and a second surface disposed within an electronic enclosure. The first surface can be disposed between a heat producing electronic device and the chamber. The second surface can include at least a portion of an exterior surface forming the electronic enclosure. The first aperture can be disposed on the second surface. The method can further include drafting a fluid from the chamber via a second aperture disposed on the first surface.

Figure 1:
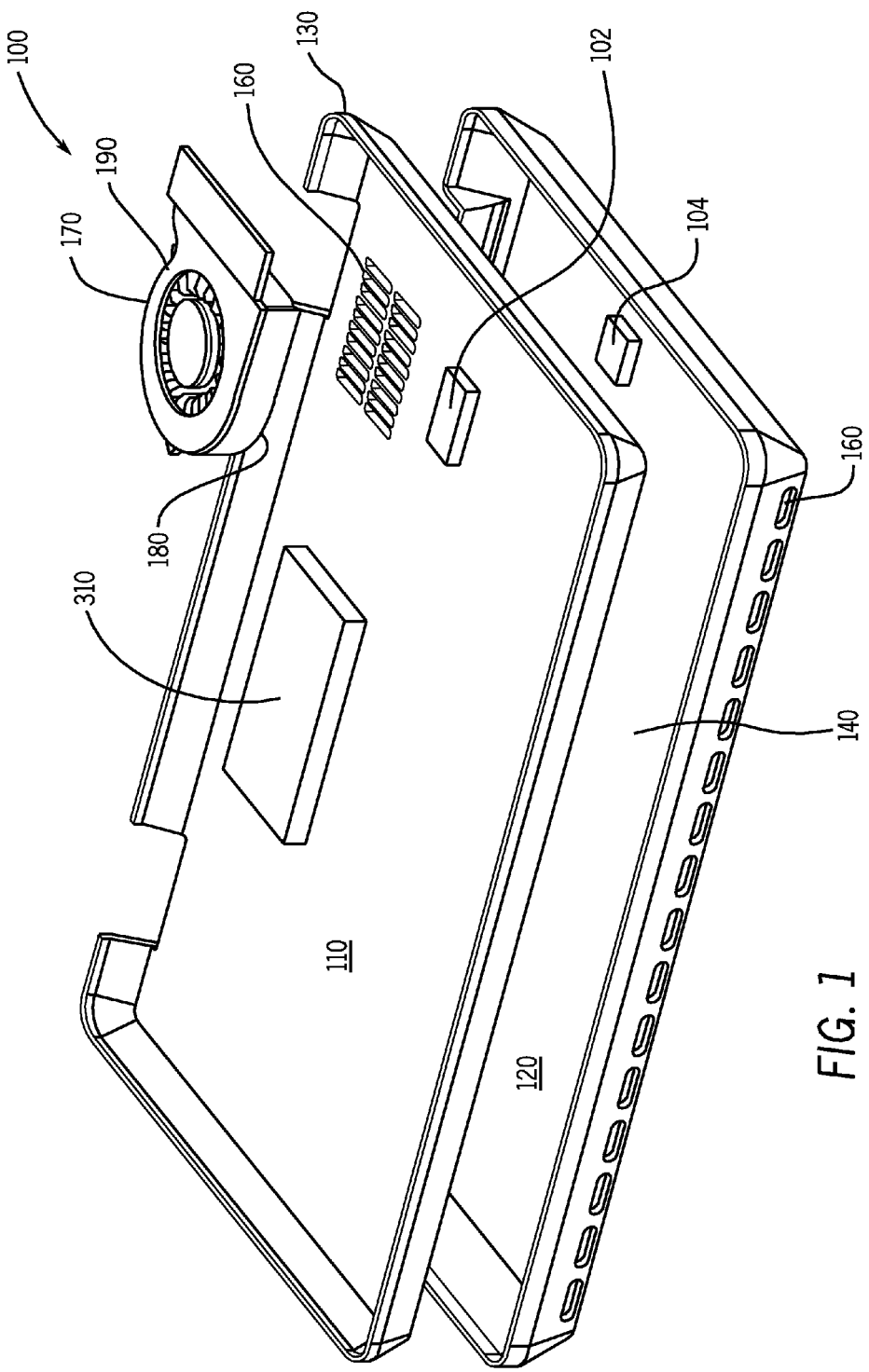
FIG. 1 is an exploded perspective view of an illustrative thermal management system, according to one or more embodiments described herein.

FIG. 1 is an exploded perspective view of an illustrative thermal management system 100, according to one or more embodiments. The thermal management system 100 can include a first surface 110 having a perimeter 130 and a second surface 120. In at least some embodiments, the first surface 110 can be an interior surface disposed within an electronic enclosure, as depicted in FIG. 1. In at least some embodiments, the second surface 120 can form at least a portion of an exterior surface of an electronic enclosure, such as depicted in FIG. 1. Example electronic enclosures can include, but are not limited to, a laptop computer enclosure as depicted in FIG. 1, a portable computer enclosure, a tablet computer enclosure, a netbook enclosure, a cellular device enclosure, a handheld gaming device enclosure, and the like.

The first surface 110 and the second surface 120 can be structured such that when the perimeter 130 of the first surface 110 is disposed proximate the second surface 120, a chamber 140 is formed between the first and second surfaces. At least one first aperture 150 can be disposed in, on, or about all or a portion of the second surface 120 to provide one or more channels for fluid communication between the chamber 140 and the exterior environment. At least one second aperture 160 can be disposed in, on, or about the first surface 110 to provide one or more channels for fluid communication between the chamber 140 and the exterior environment. In at least some embodiments, the at least one first aperture 150 can provide fluid communication between the chamber 140 and the exterior of the electronic enclosure. In at least some embodiments, the at least one second aperture 160 can provide fluid communication between the chamber 140 and one or more spaces internal to the electronic enclosure, an internal space containing one or more heat producing electronic devices 310 such as a central processing unit ("CPU"), a graphical processing unit ("GPU"), or a non-volatile memory module such as a hard disk drive ("HDD") or solid state storage device ("SSD").

The thermal management system 100 can include a fluid mover 170 having a fluid inlet 180 and a fluid discharge 190. In at least some embodiments, the fluid inlet 180 can be at least partially disposed proximate the at least one second aperture 160, such that the chamber 140 can provide at least a portion of the fluid inflow to the fluid mover 170. Where the inlet 180 of the fluid mover 170 is at least partially disposed proximate the at least one second aperture 160, a negative pressure can be created within the chamber 140 when the fluid mover 170 operates.

The first surface 110 can include any surface disposed at least partially within an electronic device that is suitable for dividing the interior of the device into two or more spaces. The first surface 110 can have any shape, geometry, structure, or shape however, the perimeter 130 of the first surface 110 should be adapted to provide a reasonably tight fit between the first surface 110 and the second surface 120. By providing such a fit between the surfaces, the chamber 140 can be placed under a negative pressure when an air mover 170 pulls a fluid inflow from the chamber 140 via the one or more second apertures 160.

The first surface 110 can include any material or substance, including a metallic structure, a non-metallic structure, and a composite structure (i.e., containing both metallic and non-metallic materials). In at least some embodiments, stand-offs or protrusions can be disposed on or about all or a portion of the first surface 110 to provide a minimum separation distance between the first surface 110 and the second surface 120. In at least some embodiments, the first surface 110 can be an insulating material, minimizing the transfer of heat to the chamber 140 proximate the first surface. In at least some embodiments at least a portion of the first surface 110 can be a material capable of conducting heat. A conductive first surface 110 may provide additional heat transfer from a heat producing electrical device 310 disposed proximate the first surface 110, for example by facilitating the flow of heat from the heat producing electrical device 310, through the first surface 110 and into the fluid flowing through the chamber 140.

The second surface 120 can have any shape, geometry, structure or size however, the shape or configuration of the second surface 120 should be adapted to provide a reasonably tight fit between the first surface perimeter 130 and the second surface 120. The second surface 120 can include any material or substance, including a metallic structure, a non-metallic structure, and a composite structure (i.e., containing both metallic and non-metallic materials). The second surface 120 can include all or a portion of the exterior surface of an electronic enclosure, for example an enclosure disposed at least partially about a portable electronic device having a heat producing device disposed at least partially therein.

The chamber 140 formed by the first and second surfaces 110, 120 can extend across each of the surfaces in whole or in part. The chamber 140 can provide both an insulating layer between the surfaces and a pathway or avenue for moving a fluid across the second surface 120, thereby lowering the surface temperature of the second surface 120. Where the second surface 120 forms all or a portion of an electronic enclosure, a lower surface temperature can facilitate use or extended use of the device by a user. In contrast, where the chamber 140 is not present, and all or a portion of the first and second surfaces 110, 120 are proximate, heat can more freely flow from the heat producing electronic device 310, through the first surface 110 to the second surface 120, thereby increasing the surface temperature and limiting the comfort and utility of the electronic device to the user. In some embodiments, a thermal sensor 104 can be used to measure the temperature of the second surface 120.

The chamber 140 can include at least one first aperture 150 through the second surface 120 permitting fluid entry to the chamber 140. For example, in one embodiment, the at least one aperture 150 can permit the flow of air from the ambient environment surrounding the second surface 120 into the chamber 140. The chamber 140 can also include at least one second aperture 160 disposed through the first surface 110 to permit the exit of fluid from the chamber 140. In some embodiments the at least one first aperture 150 can be disposed distal from the at least one second aperture 160 to provide a sweep, or flow, of fluid from the at least one first aperture 150 to the at least one second aperture 160. The at least one first aperture 150 can include any number of apertures of any shape, size, or geometry disposed through the second surface 120. Similarly, the at least one second aperture 160 can include any number of apertures having any shape, size, or geometry disposed through the first surface 110.

In some embodiments, an air mover 170 can be mounted proximate the at least one second aperture 160. The air mover 170 can have a fluid inlet 180 for fluid inflow and a fluid discharge 190 for fluid outflow. In some embodiments, a controller 102 can be used to modulate fluid outflow from the chamber 140. Where the fluid inlet 180 is at least partially disposed proximate the at least one second aperture 160, the inflow to the fluid mover 170 can originate in whole or in part from the fluid within the chamber 140. In such an embodiment, the chamber 140 can be maintained at a negative pressure measured with respect to the ambient pressure outside of the chamber 140. Maintaining a negative pressure within the chamber 140 can urge the flow of external fluid into the chamber 140 via the at least one first aperture 150.

Where the outlet 190 is disposed proximate at least a portion of the at least one second aperture 160, the outflow from the fluid mover 170 can provide in whole or in part the fluid disposed in the chamber 140. In such an embodiment, the chamber 140 can be maintained at a slight positive pressure measured with respect to the ambient pressure outside of the chamber 140. Maintaining a slight positive pressure within the chamber 140 can urge the flow of fluid from the chamber 140 via the at least one first aperture 150 disposed in the second surface 120.

The fluid mover 170 can include any type of device capable of pumping a fluid, for example a fan capable of pumping a gaseous fluid, or a pump capable of pumping a liquid fluid. In some embodiments, the fluid mover 170 can include a box type air mover disposed within a portable electronic device, such as the laptop computer enclosure depicted in FIG. 1.

Figure 2:
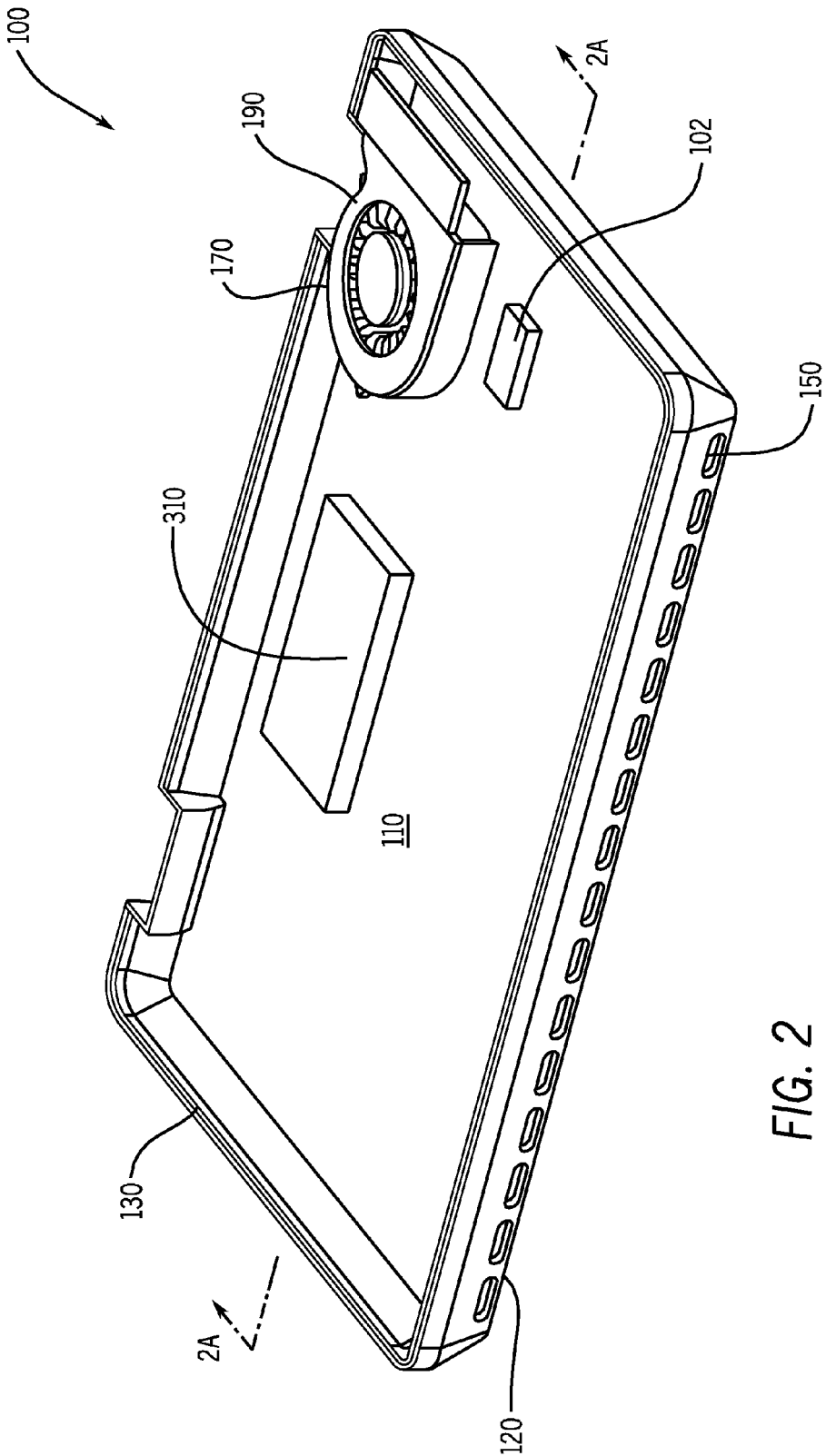
FIG. 2 is a perspective view of the illustrative thermal management system depicted in FIG. 1, according to one or more embodiments described herein.
Figure 2A:
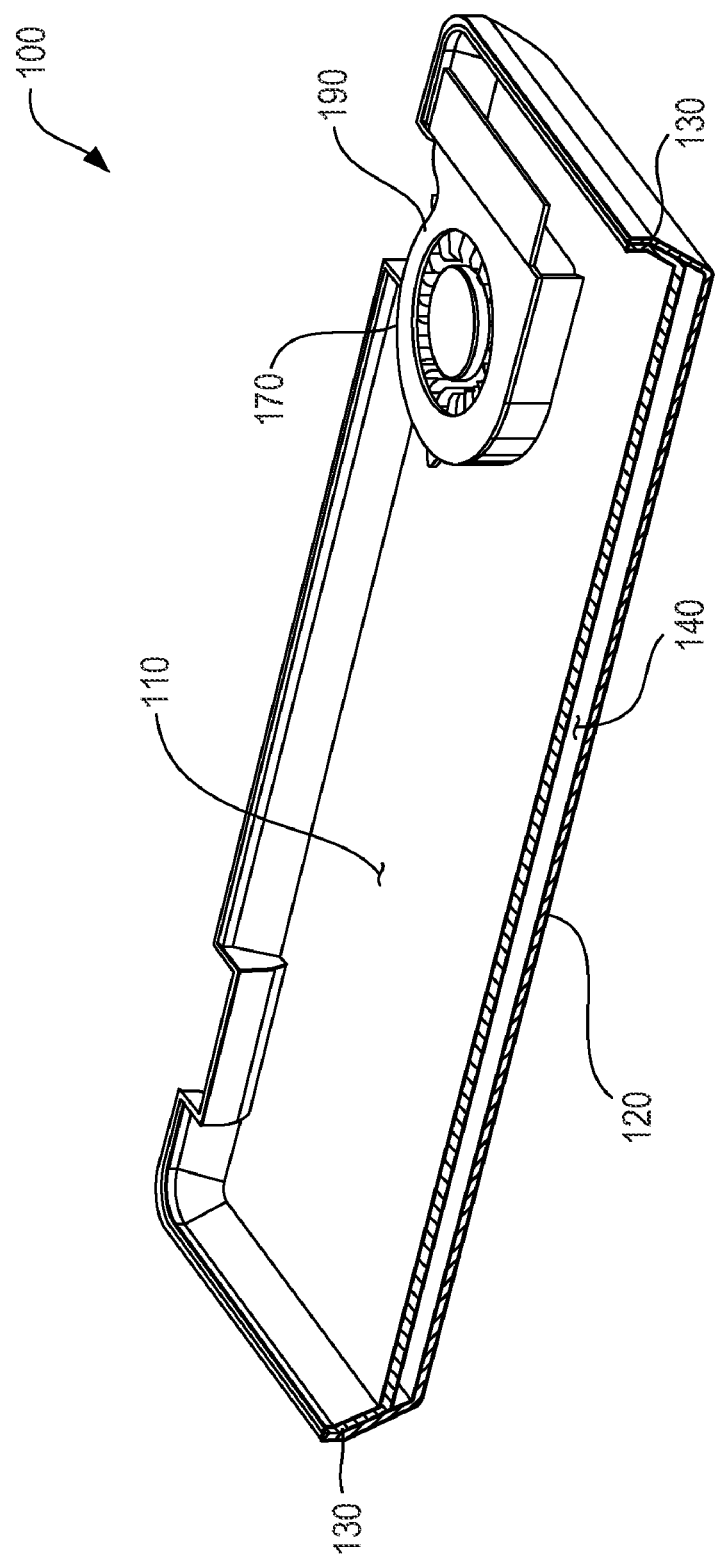
FIG. 2A is a sectional perspective view of the illustrative thermal management system depicted in FIG. 2, along line 2A-2A, according to one or more embodiments described herein.

For clarity and ease of description, FIGS. 2 and 2A will be described in detail together. FIG. 2 is a perspective view of the assembled, illustrative, thermal management system 100 depicted in FIG. 1, according to one or more embodiments. FIG. 2A is a sectional perspective view of the assembled, illustrative, thermal management system 100 depicted in FIG. 2, along line 2A-2A, according to one or more embodiments. As depicted in FIGS. 2 and 2A, the perimeter 130 of the first surface 110 can be disposed proximate the second surface 120 to form the chamber 140. The chamber 140 can extend in whole or in part across all or a portion of the second surface 120. In some embodiments, the at least one first aperture 150 can be disposed proximate all or a portion of the second surface 120 forming the chamber 140.

Figure 3:
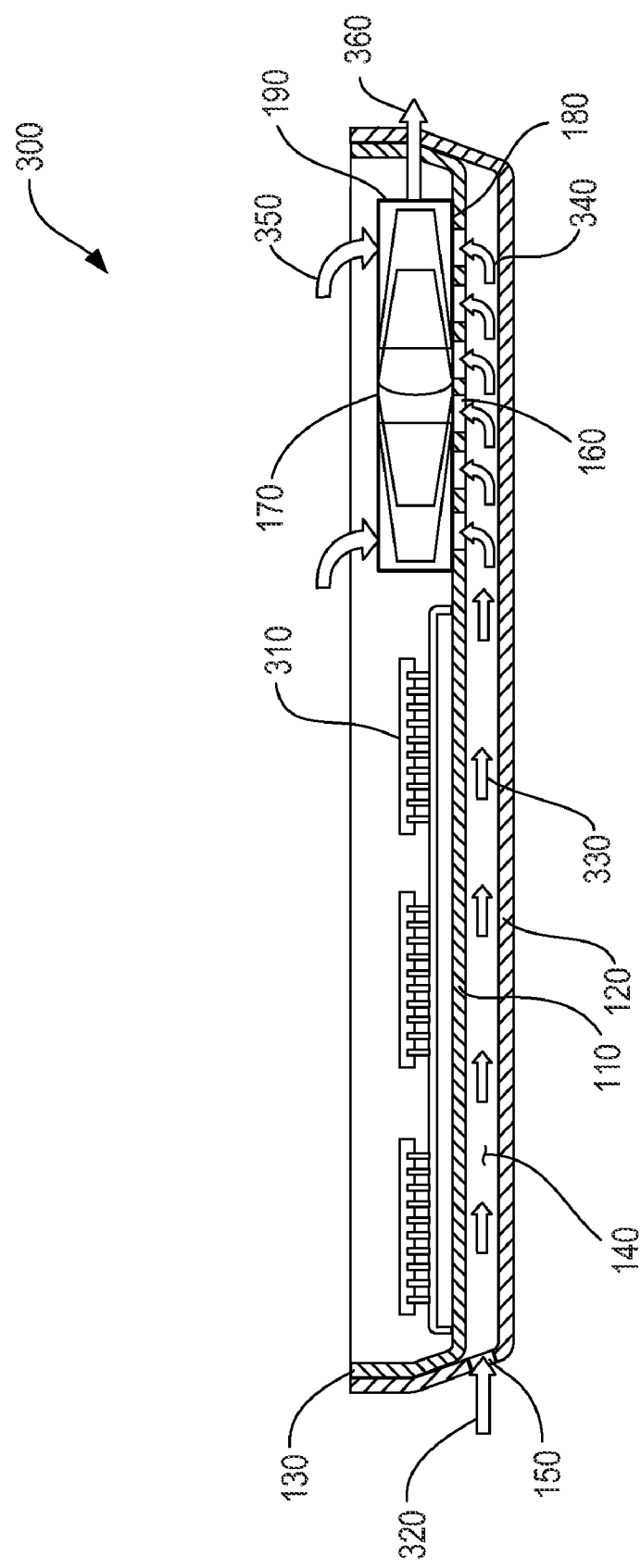
FIG. 3 is a partial cross-sectional view of the illustrative thermal management system, according to one or more embodiments described herein.

FIG. 3 is a partial cross-sectional view of an illustrative thermal management system 300, according to one or more embodiments. The system 300 can include a heat producing electronic device 310 disposed proximate the first surface 110. A fluid, for example ambient air surrounding, the second surface 120, can be drawn 320 into the chamber 140.

Within the chamber 140, the fluid can flow 330, passing along the first surface 110 and the second surface 120. Such a fluid flow 330 can be useful, for example, in preventing or minimizing the transmission of heat from the heat producing electronic device 310, through the first surface 110 to the second surface 120. Minimizing the transmission of heat can reduce the surface temperature of the second surface 120 beyond that which would occur if the fluid were not allowed to flow 330 within the chamber 140. Reduced second surface 120 temperatures can also provide a more favorable and enjoyable user experience, as the lower temperature second surface 120 can be handled, contacted, or touched with a greater degree of comfort.

At least a portion of the fluid flow 330 within the chamber 140 can provide all or a portion of the inflow 340 to the inlet 180 of the fluid mover 170. The inflow 340 to the fluid mover 170 can reduce the pressure within the chamber 140 to a level less than the ambient environment outside of the chamber 140. Such a reduction in pressure within the chamber 140 can induce the drawing 320 of additional fluid into the chamber 140.

In at least some embodiments, the fluid mover 170 can also draw a second inflow 350 from the region surrounding the heat producing electronic device 310. For example, a second inflow 350 from about a heat producing device 310 disposed within a laptop computer enclosure. The second inflow 350 can provide additional cooling for the heat producing electronic device 310 while the inflow 340 simultaneously limits the second surface 120 temperature increase. In some embodiments, the cross-sectional area of the second aperture 160 can be used to control or otherwise limit the fluid inflow 340 from the chamber 140 to the fluid mover 170. In at least some embodiments, the area of the at least one second aperture 160 can be manually or automatically adjustable or variable to balance the flow between the inflow 340 and the second inflow 350.

The fluid entering the fluid mover 170 via the inflow 340 and second inflow 350 can flow from the fluid mover discharge 190 as an outflow 360. In at least some embodiments the temperature of the outflow 360 can be greater than the temperature of the fluid drawn into 320 into the chamber 140. In some embodiments, the outflow 360 can flow to the exterior region of the second surface 120 via one or more ports disposed within the first surface 110 and the second surface 120.

Figure 4:
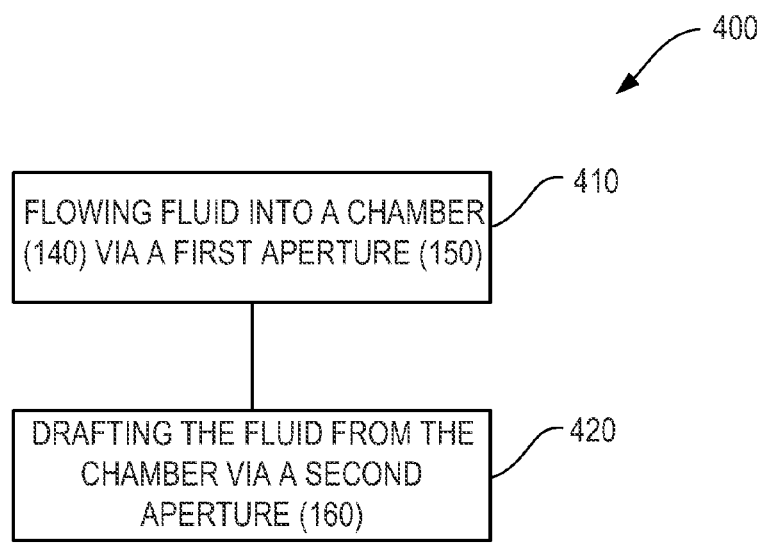
FIG. 4 is a flow diagram of an illustrative thermal management method, according to one or more embodiments described herein.

FIG. 4 is a flow diagram of an illustrative thermal management method 400, according to one or more embodiments. The method 400 can include flowing a fluid into a chamber 140 via a first aperture 150 at 410. The method can also include drafting the fluid from the chamber 140 via a second aperture 160 at 420.

Figure 5:
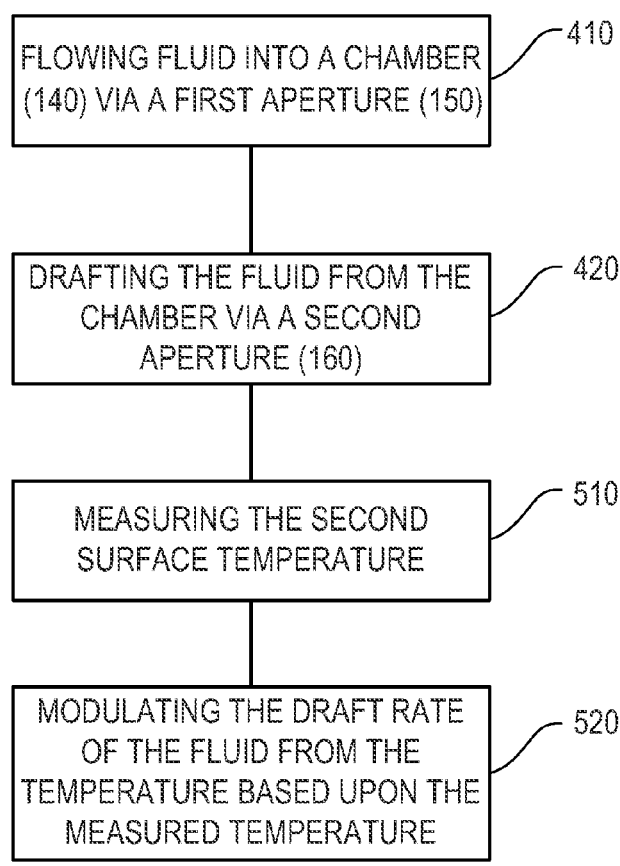
FIG. 5 is a flow diagram of another illustrative thermal management method, according to one or more embodiments described herein.

FIG. 5 is a flow diagram of another illustrative thermal management method 500, according to one or more embodiments. The method 500 can be as described in detail with reference to FIG. 4 above including, in addition, measuring the temperature of the second surface 120 at 510. In response to the measured temperature, the draft 340 of the fluid from the chamber 140 can be modulated to maintain a desired temperature at 520. Various methods can be used to modulate the draft 340 of fluid from the chamber, for example the cross sectional area of the second aperture 160 can be varied to adjust the inflow to the fluid mover 170. In other embodiments, the outflow 360 from the fluid mover 170 can be modulated. Such modulation can be used to maintain the temperature of the second surface below a predetermined threshold, for example below 100° F., so as to minimize user discomfort.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

While the foregoing is directed to embodiments of the present invention, other and further embodiments of the invention may be devised without departing from the basic scope thereof, and the scope thereof is determined by the claims that follow.

What is claimed is:

1. A thermal management system, comprising:
   an electronic device enclosure of a computing device, the electronic device enclosure comprising a first surface and a second surface, wherein the second surface is an exterior surface of the computing device;
      wherein at least a portion of a perimeter of the first surface is disposed proximate the second surface to provide a chamber between the first and second surfaces;
   at least one first aperture in fluid communication with the chamber and disposed on the second surface;
   at least one second aperture in fluid communication with the chamber and disposed on the first surface; and
   at least one fluid mover comprising a fluid inlet and a fluid discharge disposed proximate the second aperture;
      wherein fluid from the chamber provides an inflow to the fluid inlet; and
      wherein an outflow from the fluid discharge is directed to the exterior of the electronic device enclosure.

2. The system of claim 1, further comprising a thermal sensor to measure a temperature of the second surface.

3. The system of claim 2, further comprising a controller to modulate the inflow to the fluid mover proportionate to the measured temperature of the second surface.

4. The system of claim 1, further comprising a heat producing electronic device disposed proximate the first surface, opposite the chamber.

5. The system of claim 4, wherein the heat-producing electronic device comprises at least one selected from the group consisting of: a central processing unit, a graphical processing unit, a hard disk drive, and a solid state storage device.

6. A thermal management method, comprising:
   flowing a fluid into a chamber via a first aperture;
      wherein the chamber is between a first surface and a second surface and is disposed within an electronic enclosure;
      wherein the first surface comprises a surface disposed between a heat producing electronic device and the chamber;
      wherein the second surface comprises an exterior surface of the electronic enclosure; and
      wherein the first aperture is disposed on the second surface;
   drafting a fluid from the chamber via a second aperture;
      wherein the second aperture is disposed on the first surface and the second aperture has an adjustable cross-sectional area.

7. The method of claim 6, further comprising:
   measuring a temperature of the second surface using a thermal sensor; and
   adjusting the cross-sectional area of the second aperture to modulate a draft rate of the fluid from the chamber based upon the measured temperature of the second surface.

8. The method of claim 6, wherein the electronic device is at least one selected from the group consisting of: a central processing unit, a graphical processing unit, a hard disk drive, and a solid state storage device.

9. The method of claim 6, further comprising:
creating a first pressure within the chamber less than a second pressure surrounding the chamber using a fluid mover comprising a fluid inlet disposed proximate the second aperture;
  wherein an inflow to the fluid mover inlet is provided, at least in part, from the chamber.

10. A thermal control system, comprising:
a chamber located inside a computing device, the chamber defined by a first surface and a second surface;
  wherein the first surface comprises a surface disposed between a heat producing electronic device and the chamber; and
  wherein the second surface comprises an exterior surface of the computing device;
at least one first aperture in communication with the chamber and disposed on the second surface;
  wherein the at least one first aperture permits a flow of a fluid into the chamber;
at least one second aperture in communication with the chamber and disposed on the first surface;
  wherein the at least one second aperture permits an outflow of the fluid from the chamber; and
a fluid mover disposed proximate the at least one second aperture;
  wherein an inlet to the fluid mover is disposed proximate the second aperture to permit an outflow from the chamber to the fluid mover; and
  wherein an outlet from the fluid mover is disposed to permit the outflow from the fluid mover to exit the computing device.

11. The system of claim 10, wherein the electronic device is at least one selected from the group consisting of: a central processing unit, a graphical processing unit, a hard disk drive, and a solid state storage device.

12. A thermal management method, comprising:
introducing a fluid into a chamber via a first aperture disposed on a second surface;
  wherein the chamber is between a first surface and the second surface disposed within an electronic enclosure; and
  wherein a heat producing electronic device is disposed proximate the first surface;
flowing a fluid through the chamber;
creating a negative pressure within the chamber, the negative pressure measured within the chamber with respect to an ambient pressure outside of the chamber;
  wherein the negative pressure is created by using at least a portion of the fluid within the chamber as an inflow to a fluid mover; and
  wherein the inflow to the fluid mover exits the chamber via a second aperture having an adjustable cross-sectional area; and
exhausting at least a portion of the fluid as an outflow from the fluid mover.

13. The method of claim 12, further comprising:
measuring a temperature of the second surface.

14. The method of claim 13, further comprising:
modulating the fluid outflow from the chamber in response to the measured temperature of the second surface.

15. The method of claim 14, wherein modulating the fluid outflow from the chamber comprises varying the cross-sectional area of the second aperture.

16. The method of claim 14, wherein modulating the fluid outflow from the chamber comprises varying the outflow from the fluid mover.

* * * * *